(12) United States Patent
Gabard-Cuoq et al.

(10) Patent No.: US 8,156,801 B2
(45) Date of Patent: Apr. 17, 2012

(54) FLOW METERING DEVICE

(75) Inventors: Céline Gabard-Cuoq, Palaiseau (FR); Jean-Michel Hache, Bourg la Reine (FR); Gilles Roux, Sainte Genevieve des Bois (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 528 days.

(21) Appl. No.: 12/362,538

(22) Filed: Jan. 30, 2009

(65) Prior Publication Data

US 2009/0193885 A1 Aug. 6, 2009

(30) Foreign Application Priority Data

Jan. 31, 2008 (EP) .................................. 08150877

(51) Int. Cl.
*E21B 47/10* (2012.01)
*F16K 5/16* (2006.01)

(52) U.S. Cl. ........... 73/152.29; 251/315.16; 251/129.14; 137/15.22; 137/315.18

(58) Field of Classification Search .............. 73/152.29; 251/129.14, 146, 315.16, 315.01; 137/15.22, 137/315.18, 247.21, 551, 557; 861/75, 77, 861/78, 79

See application file for complete search history.

(56) References Cited

U.S. PATENT DOCUMENTS

| 2,764,891 | A | | 10/1956 | McGowen, Jr. |
| 2,973,182 | A | * | 2/1961 | Gill ............................... 251/174 |
| 3,352,155 | A | * | 11/1967 | Penet ............................. 73/198 |
| 4,130,128 | A | | 12/1978 | Kaneko |
| 4,467,823 | A | * | 8/1984 | Shaffer et al. .............. 137/15.18 |
| 4,703,664 | A | * | 11/1987 | Kirkpatrick et al. ......... 73/866.5 |
| 4,936,547 | A | * | 6/1990 | Obst ........................ 251/315.11 |
| 5,360,036 | A | * | 11/1994 | Kieper ...................... 137/625.22 |
| 6,971,633 | B2 | * | 12/2005 | Gillen ....................... 251/315.07 |
| 2007/0251577 | A1 | * | 11/2007 | Furnival ................... 137/315.18 |
| 2009/0032762 | A1 | * | 2/2009 | Junier ....................... 251/315.16 |
| 2009/0033516 | A1 | * | 2/2009 | Alteirac et al. ............. 340/853.2 |

* cited by examiner

*Primary Examiner* — Hezron E Williams
*Assistant Examiner* — Rodney T Frank
(74) *Attorney, Agent, or Firm* — Matthias Abrell; Darla Fonseca; Jeff Griffin

(57) ABSTRACT

A fluid flow metering device comprises a ball valve locatable in a fluid flow, having at least two transverse bores through the ball valve, a first transverse bore and a second transverse bore. The first transverse bore includes a fluid flow metering apparatus for measuring the rate of fluid flow through the first transverse bore. The ball valve is preferably rotatable between a first metering position where fluid is flowable through the first transverse bore and a second open position where fluid is flowable through the second transverse bore. In addition, the second transverse bore is dimensioned so that a tool is movable through the second transverse bore when the ball valve is in the second open position.

17 Claims, 1 Drawing Sheet

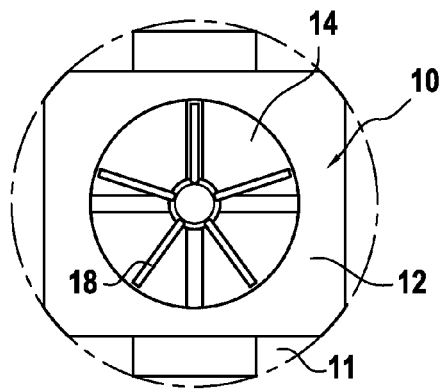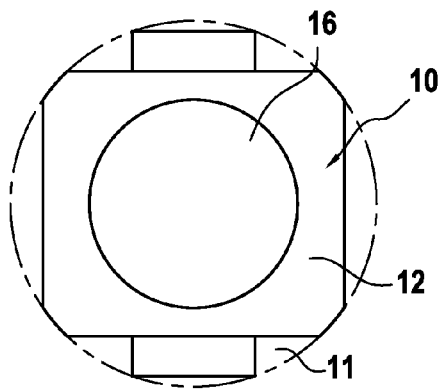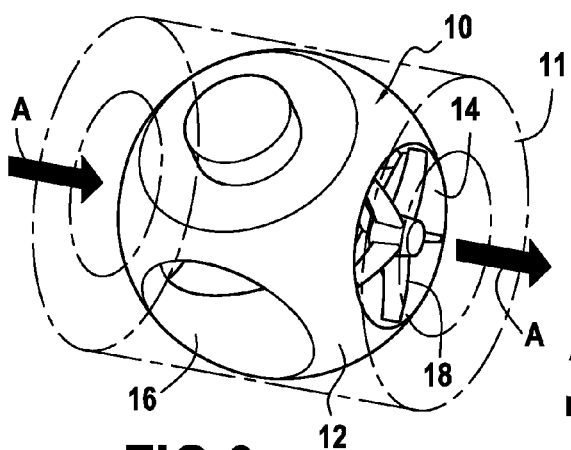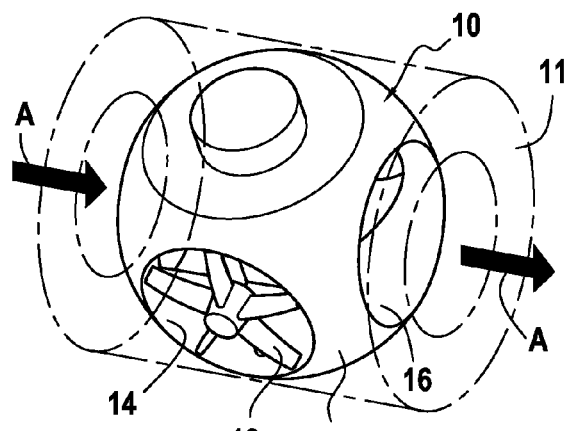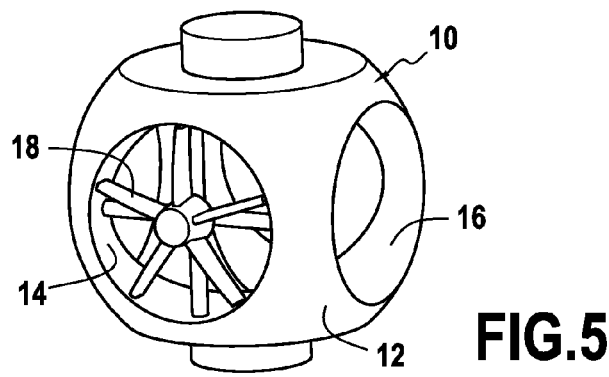

FLOW METERING DEVICE

TECHNICAL FIELD

This invention relates generally to a fluid flow metering device. More particularly, the present invention relates to a fluid flow metering device comprising a ball valve.

BACKGROUND ART

Conventionally, well operation in oil and gas wells, or the like, and production in these wells involves continuous monitoring of various subsurface parameters. It is essential to predict the production capacity and lifetime of a subsurface formation. These parameters have generally been obtained during these operations either through wireline logging, drill stem tests or logging while drilling.

With the increase in the importance of production optimization in order to get more oil from depleted reservoirs, newly drilled wells, deep wells, wells having more complex trajectories and wells located in more challenging environments, the long term monitoring of wells has become even more desirable. In order to minimize down time during drilling operations and thus make production more efficient, it is advantageous to monitor these parameters without disrupting well production or operation, or preventing well intervention operations.

One of these parameters which require monitoring is fluid flow measurement. Of particular advantage is the monitoring of multiphase fluid flow which does not require the different phases of the fluid to be separated and then measured. It is an object of the present invention to provide a device that allows for multiphase fluid flow metering in a well while still allowing access through the device into the well for downhole intervention or measurement tools.

U.S. Pat. No. 3,352,155 teaches a combination fluid valve and flowmeter assembly which provides an alternative route for fluid to pass through that bypasses the flowmeter itself. Likewise, U.S. Pat. No. 2,764,891 teaches a plug valve adapted to provide flow passage and permit fluid pressure to be gauged. In both prior art devices, the fluid path includes curves and bends in which a rigid tool would not be able to pass through.

It is therefore desirable to provide a method and apparatus (e.g., which also can be referred to herein as a "system") that addresses the above and other problems.

DISCLOSURE OF INVENTION

A first aspect of the present invention provides a fluid flow metering device comprising:
- a ball valve locatable in the fluid flow, having at least two transverse bores through the ball valve, a first transverse bore and a second transverse bore;
- the first transverse bore including a fluid flow metering apparatus for measuring the rate of fluid flow through the first transverse bore;
- the ball valve being rotatable between a first metering position where fluid is flowable through the first transverse bore and a second open position where fluid is flowable through the second transverse bore; and
- the second transverse bore being dimensioned so that a tool is movable through the second transverse bore when the ball valve is in the second open position.

Further according to the present invention, the ball valve is locatable in a conduit through which fluid is flowable.

In one form of the present invention the conduit is a pipeline. The pipeline may be in a well borehole.

Preferably, the fluid flow metering apparatus is capable of multiphase fluid flow rate measurement. The fluid flow metering apparatus may include at least one spinner flowmeter. In one form of the present invention the spinner flowmeter may be a full bore spinner flowmeter. In another form of the present invention there may be a plurality of spinner flowmeters in the first transverse bore.

Further the fluid flow metering apparatus may be a venturi device. The fluid flow metering apparatus may even further be a spring loaded flapper valve.

The tool may be an intervention tool or a measurement tool.

A second aspect of the present invention provides a method for measuring fluid flow, the method comprising:
- positioning a ball valve in a fluid flow, having a first transverse bore and a second transverse bore through the ball valve, the first transverse bore including a fluid flow metering apparatus;
- rotating the ball valve to a first metering position where fluid is flowable through the first transverse bore;
- measuring the fluid flow rate of the fluid moving through the first transverse bore by means of the fluid flow metering apparatus; and
- rotating the ball valve to a second open position where fluid is flowable through the second transverse bore, the second transverse bore being dimensioned so that a tool is movable through the second transverse bore, when the ball valve is in the second open position.

The method may further include positioning the ball valve in a conduit through which fluid is flowable.

In one form of the present invention the conduit is a pipeline. The pipeline may be in a well borehole.

Preferably the fluid flow metering apparatus may measure multiphase fluid flow rates.

A third aspect of the present invention provides a method for measuring fluid flow, the method comprising using the fluid flow metering device as described above.

These together with other aspects, features, and advantages of the present invention, along with the various features of novelty, which characterize the invention, are pointed out with particularity in the claims annexed to and forming a part of this disclosure. The above aspects and advantages are neither exhaustive nor individually or jointly critical to the spirit or practice of the invention. Other aspects, features, and advantages of the invention will become readily apparent to those skilled in the art from the following detailed description in combination with the accompanying drawings, illustrating, by way of example, the principles of the invention. Accordingly, the drawings and description are to be regarded as illustrative in nature, and not restrictive.

BRIEF DESCRIPTION OF FIGURES IN THE DRAWINGS

FIG. 1 shows a schematic view from one end of a fluid flow metering device in the first position, constructed in accordance with a preferred embodiment of the present invention;

FIG. 2 shows a schematic side view of a fluid flow metering device in the second position, constructed in accordance with a preferred embodiment of the present invention;

FIG. 3 shows a schematic view from one end of the fluid flow metering device in the first position, constructed in accordance with a preferred embodiment of the present invention;

FIG. 4 shows a schematic side view the fluid flow metering device in the second position, constructed in accordance with a preferred embodiment of the present invention; and FIG. 5 shows an isometric view of the fluid flow metering device, constructed in accordance with a preferred embodiment of the present invention.

MODE(S) FOR CARRYING OUT THE INVENTION

Various implementations and aspects of the invention will now be described in detail with reference to the accompanying figures. Still other aspects, features, and advantages of the present invention are readily apparent from the entire description thereof, including the figures, which illustrates a number of exemplary embodiments and implementations. The invention is also capable of other and different implementations, and its several details can be modified in various respects, all without departing from the spirit and scope of the present invention. Accordingly, the drawings and descriptions are to be regarded as illustrative in nature, and not as restrictive. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Referring to the drawings, illustrations, pictures and attachments and in particular FIGS. 1 to 5, a preferred embodiment of the present invention is shown in which a fluid flow metering device 10 for measuring fluid flow is located in a conduit 11, such as a pipeline of an oil and gas well borehole, or the like, and comprises a ball valve 12. The fluid may be a liquid and/or a gas, and may in addition contain dispersed solid particles. There are two transverse bores through the ball valve, being a first transverse bore 14 and a second transverse bore 16.

The first transverse bore 14 includes a fluid flow metering apparatus 18 for measuring the rate of fluid flow through the first transverse bore 14. The ball valve 12 being rotatable between a first metering position, as shown in FIG. 3, where fluid may flow through the first transverse bore 14, and a second open position, as shown in FIG. 4, where fluid is flowable through the second transverse bore 16. The direction of fluid flow is shown by an arrow A in FIGS. 3 and 4.

The flow metering apparatus 18 is located in the ball valve 12 and it is preferably capable of multiphase fluid flow rate measurement. In FIGS. 1, 3, 4 and 5 the device 10 is shown as having a spinner flowmeter 20. The spinner flowmeter 20 is designed to allow for sufficient flow area between the blades and it also has a reverse function so that if clogging occurs it may be unclogged.

The spinner flowmeter 20 may also be a full bore spinner flowmeter or there may be a plurality of spinner flowmeters in the first transverse bore 14. The plurality of spinner flowmeters may comprise an arrangement of mini-spinners with or without electrical and/or optical sensors to provide individual phase fraction measurement as well.

The fluid flow metering apparatus 18 may also be a venturi device. In this case, density measurement is used to convert total mass flow rate measurement into total volumetric flow rate. The venture device would be particularly preferable for use in hostile environments where the presence of small and large particles can cause damage to or cause a meter to jam.

The fluid flow metering apparatus 18 may even further be a spring loaded flapper valve.

Fluid flow metering device 10 provides an accurate multiphase flow metering device for downhole applications. The problem with bore restriction of the known multiphase flow meters is overcome as, when required, device 10 is full bore and allows access through it.

In the metering position ball valve 12 in device 10 performs the flow rate measurement across the valve section. When ball valve 12 is in the open position the flow metering apparatus 18 of device 10 may be turned by substantially 90° brought into a storage position. The storage position is when flow metering apparatus 18 is located on one side of the ball valve 12, which allows a full-bore access through device 10.

In aggressive downhole environments access through the fluid flow meter device 10 is required to allow various downhole tools to be deployed downhole, such as, for example intervention or measurement tools. Measurement tools also include tools for logging. For instance, in drill stem tests access through the fluid flow meter device 10 could be required for deployment of a perforating tool. The downhole tools are movable through the second transverse bore 14 when ball valve 12 is in the open position. In this way, it is not a requirement that device 10 first be removed from conduit 11 before the tool can be deployed down the pipeline downhole.

As an example, the downhole tools movable through the second transverse bore 14 may have a rigid outer diameter from about one to about three inches in some embodiments of the present disclosure, and preferably around two inches.

It will be understood that fluid flow metering device 10 may also be locatable in pipelines in other industrial applications, such as, for example in the food or other chemical industries.

From the above description it is clear that the present invention is well adapted to carry out the disclosed aspects, and to attain the advantages mentioned herein as well as those inherent in the invention. While presently preferred implementations of the invention have been described for purposes of disclosure, it will be understood that numerous changes may be made which readily suggest themselves to those skilled in the art and which are accomplished within the spirit of the invention disclosed.

The invention claimed is:

1. A fluid flow metering device comprising:
   a ball valve locatable in the fluid flow, having at least two transverse bores through the ball valve, a first transverse bore and a second transverse bore;
   the first transverse bore including a fluid flow metering apparatus for measuring the rate of fluid flow through the first transverse bore;
   the ball valve being rotatable between a first metering position where fluid is flowable through the first transverse bore and a second open position where fluid is flowable through the second transverse bore; and
   the first transverse bore and the second transverse bore intersect each other;
   the valve is moveable between the first metering position in which the metering apparatus can measure the fluid flow through the first transverse bore and the second open position wherein the metering apparatus is located on one side of the valve; and
   the second transverse bore being dimensioned so that a tool is movable through the second transverse bore when the ball valve is in the second open position.

2. The device as claimed in claim 1, wherein the ball valve is located in a conduit through which fluid is flowable.

3. The device as claimed in claim 2, wherein the conduit is a pipeline.

4. The device as claimed in claim 3, wherein the pipeline is in a well borehole.

5. The device as claimed in claim 1, wherein the fluid flow metering apparatus is capable of multiphase fluid flow rate measurement.

6. The device as claimed in claim 1, wherein the fluid flow metering apparatus includes at least one spinner flowmeter.

7. The device as claimed in claim 6, wherein the spinner flowmeter is a full bore spinner flowmeter.

8. The device as claimed in claim 6, wherein the fluid flow metering apparatus includes a plurality of spinner flowmeters.

9. The device as claimed in claim 1, wherein the fluid flow metering apparatus is a venturi device.

10. The device as claimed in claim 1, wherein the fluid flow metering apparatus is a spring loaded flapper valve.

11. The device as claimed in claim 1, wherein the tool is an intervention tool.

12. The device as claimed in claim 1, wherein the tool is a measurement tool.

13. A method for measuring fluid flow, the method comprising the steps of:

positioning a ball valve in a fluid flow, having a first transverse bore and a second transverse bore through the ball valve, the first transverse bore including a fluid flow metering apparatus and the first transverse bore and the second transverse bore intersect each other;

rotating the ball valve to a first metering position where fluid is flowable through the first transverse bore;

measuring the fluid flow rate of the fluid moving through the first transverse bore by means of the fluid flow metering apparatus; and rotating the ball valve to a second open position where the metering apparatus is located on one side of the valve and where fluid is flowable through the second transverse bore, the second transverse bore being dimensioned so that a tool is movable through the second transverse bore, when the ball valve is in the open position.

14. The method as claimed in claim 13, which further includes positioning the ball valve in a conduit through which fluid is flowable.

15. The method as claimed in claim 14, wherein the conduit is a pipeline.

16. The method as claimed in claim 15, wherein the pipeline is in a well borehole.

17. The method as claimed in claim 16, wherein the fluid flow metering apparatus may measure multiphase fluid flow rates.

* * * * *